United States Patent
Dogishi et al.

(10) Patent No.: US 11,507,917 B2
(45) Date of Patent: Nov. 22, 2022

(54) APPARATUS, METHOD, AND COMPUTER-READABLE MEDIUM FOR MAKING A PRODUCT WHILE RIDING ON A MOBILE OBJECT

(71) Applicant: TOYOTA JIDOSHA KABUSHIKI KAISHA, Toyota (JP)

(72) Inventors: Hiromichi Dogishi, Nagoya (JP); Masaki Shitara, Nagakute (JP); Keiji Yamashita, Nisshin (JP); Nozomi Kaneko, Nagoya (JP); Naoki Yamamuro, Nagoya (JP); Shunsuke Tanimori, Susono (JP); Ryoichi Shiraishi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 16/709,168

(22) Filed: Dec. 10, 2019

(65) Prior Publication Data
US 2020/0234238 A1 Jul. 23, 2020

(30) Foreign Application Priority Data
Jan. 23, 2019 (JP) .............................. JP2019-009487

(51) Int. Cl.
*G06Q 10/08* (2012.01)
*G06Q 50/28* (2012.01)
(Continued)

(52) U.S. Cl.
CPC ... *G06Q 10/08355* (2013.01); *G01C 21/3611* (2013.01); *G01C 21/3679* (2013.01);
(Continued)

(58) Field of Classification Search
CPC ........... B60P 3/025; B60P 3/0257; B60P 3/14; B60P 3/16; G06Q 10/08355
See application file for complete search history.

(56) References Cited

U.S. PATENT DOCUMENTS 10,991,253 B2 * 4/2021 Nixon .................. G06Q 10/083
2002/0165803 A1 * 11/2002 Iwase ................. G06Q 30/0207
705/14.1
(Continued)

FOREIGN PATENT DOCUMENTS

JP     2005172743 A  *  6/2005
JP     2018112905 A  *  7/2018
(Continued)

OTHER PUBLICATIONS

Wiggers, Kyle; "Zume, the Robot-Powered Pizza Emporium, Now Cooks Pies En Route to Your Door"; published Sep. 29, 2016, accessed as of Oct. 6, 2016; DigitalTrends.com; pp. 1-7; digitaltrends.com/cool-tech/zume-botw-delivery/ (Year: 2016).*

*Primary Examiner* — Victoria E. Frunzi
*Assistant Examiner* — Michael C Moroney
(74) *Attorney, Agent, or Firm* — Oblon, McClelland, Maier & Neustadt, L.L.P.

(57) ABSTRACT

An information processing apparatus includes a control unit configured to execute: acquiring information regarding a request of a user making a product while riding on a mobile object; acquiring information regarding an article used in making the product; acquiring information regarding a location of the article; and generating an operation command of the mobile object such that the mobile object carrying the user travels via the location of the article.

10 Claims, 13 Drawing Sheets

(51) Int. Cl.
  *G06Q 50/30* (2012.01)
  *G01C 21/36* (2006.01)
  *H04W 4/029* (2018.01)
  *G05D 1/00* (2006.01)

(52) U.S. Cl.
  CPC ......... *G05D 1/0022* (2013.01); *G05D 1/0088* (2013.01); *G06Q 10/0834* (2013.01); *G06Q 50/28* (2013.01); *G06Q 50/30* (2013.01); *H04W 4/029* (2018.02)

(56) References Cited

U.S. PATENT DOCUMENTS

| | | | |
|---|---|---|---|
| 2003/0046188 A1* | 3/2003 | Orozco | G06Q 30/0238 705/26.62 |
| 2013/0010103 A1* | 1/2013 | Ihara | G06Q 30/0207 348/116 |
| 2018/0082603 A1* | 3/2018 | Lim | G09B 5/06 |
| 2018/0217598 A1 | 8/2018 | Kuhara | |
| 2018/0242772 A1* | 8/2018 | Jenkins | G08B 21/182 |
| 2019/0266522 A1* | 8/2019 | Li | H04W 4/44 |
| 2019/0311445 A1* | 10/2019 | Werner | G06Q 50/12 |
| 2021/0217111 A1* | 7/2021 | Goldberg | G05B 19/4155 |

FOREIGN PATENT DOCUMENTS

| | | | |
|---|---|---|---|
| JP | 2018-124676 A | | 8/2018 |
| WO | WO-2019004467 A1 | * | 1/2019 |
| WO | WO-2020055769 A1 | * | 3/2020 |

* cited by examiner

FIG. 5

| USER ID | INGREDIENT ID | SELECTABILITY | LOCATION |
|---------|---------------|---------------|----------|
| U001 | A20 | SELECTABLE | L001 |
| U001 | A30 | UNSELECTABLE | L001 |
| U002 | A30 | SELECTABLE | L002 |
| U003 | A40 | SELECTABLE | L003 |
| ... | ... | ... | ... |

FIG. 6

| VEHICLE ID | LOCATION INFORMATION | WORKING STATE | SUPPORTABLE DISH | | | |
|------------|----------------------|---------------|------|------|------|------|
| E01 | F01 | STANDBY | C01 | C02 | C03 | ... |
| E02 | F02 | STANDBY | C04 | C05 | C06 | ... |
| E03 | F03 | WORKING | C07 | C08 | C09 | ... |
| ... | ... | ... | ... | ... | ... | ... |

FIG. 7

| DISH ID | INGREDIENT ID | | | |
|---|---|---|---|---|
| | #1 | #2 | #3 | ... |
| C01 | A20 | A30 | A40 | ... |
| C02 | B20 | B40 | B50 | ... |
| C03 | A20 | B30 | D50 | ... |
| ... | ... | ... | ... | ... |

FIG. 8

| USER ID | BOARDING POINT | ALIGHTING POINT | MOVING DAY AND TIME |
|---|---|---|---|
| U101 | X1 | Y1 | Z1 |
| U102 | X2 | Y2 | Z2 |
| U103 | X3 | Y3 | Z3 |
| ... | ... | ... | ... |

| DISH ID | IMAGE ID | | | |
|---|---|---|---|---|
| | #1 | #2 | #3 | ... |
| C01 | G20 | G30 | G40 | ... |
| C02 | H20 | H40 | H50 | ... |
| C03 | J20 | J30 | J50 | ... |
| ... | ... | ... | ... | ... |

FIG. 17

| USER ID | INGREDIENT ID | SELECTABILITY | LOCATION |
|---------|---------------|---------------|----------|
| U001 | A20 | SELECTABLE | L001 |
| U001 | A30_1 | UNSELECTABLE | L001 |
| U002 | A30_2 | SELECTABLE | L002 |
| U003 | A30_3 | SELECTABLE | L003 |
| ... | ... | ... | ... |

| DISH ID | INGREDIENT ID | | | |
|---|---|---|---|---|
| | #1 | #2 | #3 | ... |
| C01 | A20 | A30_1 | A40_1 | ... |
| | | A30_2 | A40_2 | ... |
| | | A30_3 | | ... |
| ... | ... | ... | ... | ... |

APPARATUS, METHOD, AND COMPUTER-READABLE MEDIUM FOR MAKING A PRODUCT WHILE RIDING ON A MOBILE OBJECT

INCORPORATION BY REFERENCE

The disclosure of Japanese Patent Application No. 2019-009487 filed on Jan. 23, 2019 including the specification, drawings and abstract is incorporated herein by reference in its entirety.

BACKGROUND

1. Technical Field

The present disclosure relates to an information processing apparatus, a method of information processing, and a program.

2. Description of Related Art

There is known a method for confirming the propriety of delivery of a package by a mobile object that travels autonomously when the delivery of the package by the mobile object that travels autonomously is specified as a delivery method (see, for example, Japanese Patent Application Publication No. 2018-124676).

SUMMARY

An object of the present disclosure is to make a product using a mobile object that travels autonomously.

One aspect of the present disclosure is an information processing apparatus configured to control a mobile object that travels autonomously based on an operation command. The apparatus includes a control unit configured to execute: acquiring information regarding a request of a user making a product while riding on the mobile object; acquiring information regarding an article used in making the product; acquiring information regarding a location of the article; and generating the operation command of the mobile object such that the mobile object carrying the user travels via the location.

One aspect of the present disclosure is a method of information processing for controlling a mobile object that travels autonomously based on an operation command. The method is configured to execute: acquiring information regarding a request of a user making a product while riding on the mobile object; acquiring information regarding an article used in making the product; acquiring information regarding a location of the article; and generating the operation command of the mobile object such that the mobile object carrying the user travels via the location.

One aspect of the present disclosure is a program for causing a computer to execute control of a mobile object that travels autonomously based on an operation command. The program causes the computer to execute: acquiring information regarding a request of a user making a product while riding on the mobile object; acquiring information regarding an article used in making the product; acquiring information regarding a location of the article; and generating the operation command of the mobile object such that the mobile object carrying the user travels via the location.

The present disclosure makes it possible to make a product using a mobile object that travels autonomously.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 illustrates a table configuration of ingredient information;

FIG. 6 illustrates the table configuration of vehicle information;

FIG. 7 illustrates the table configuration of dish information;

FIG. 8 illustrates the table configuration of movement information regarding a first user;

FIG. 17 illustrates the table configuration of the ingredient information in an ingredient information DB;

DETAILED DESCRIPTION OF EMBODIMENTS

Figure 1:
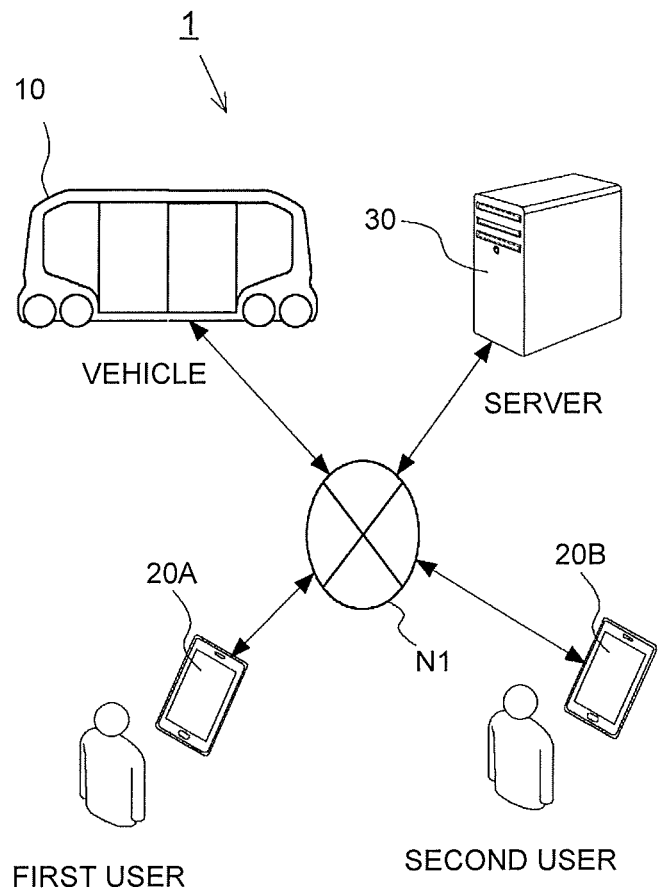
FIG. 1 shows the schematic configuration of an autonomous driving system according to an embodiment.

A mobile object controlled by an information processing apparatus that is one aspect of the present disclosure is a vehicle that travels autonomously based on an operation command. The operation command is generated such that the mobile object travels via the place of an article, such as an ingredient and a tool, necessary in making a product. When the mobile object moves in accordance with the operation command, the article necessary for making the product can be obtained. A user can make the product by itself while moving by riding on the mobile object. In short, the user can obtain an ingredient or tool by riding on the mobile object. The user can further make a product by using the ingredient or tool. The product is what the user itself can make. Examples of the product may include dishes, and devices that are completed by assembling components. For example, components, tools, or facilities necessary for making a product can be mounted on the mobile object in advance.

A control unit acquires information regarding an article used in making a product. Examples of the article used in making a product include an article used as an ingredient of the product, an article used as a component of the product, and a tool necessary for making the product. Therefore, the control unit may acquire information regarding the ingredient of the product as the information regarding the article. The control unit may acquire information regarding a tool for making the product as the information regarding the article.

The control unit acquires information regarding the location of the article. When there are a plurality of articles used in making a product, the information regarding respective locations is acquired. The information regarding the location of the article is the information indicating the place where the article is sold, or the information indicating the place where the article is rented, that is, the information regarding the place where the mobile object heads for to obtain the article. The information regarding the location of the article can be obtained from a user who manages the article, for example.

The control unit generates an operation command of the mobile object such that the mobile object travels via the location of the article. The operation command is generated by a server or the mobile object, for example. The operation command includes information regarding a route point of the mobile object. The operation command may further include information regarding a moving route of the mobile object. The mobile object travels via the location of the article in accordance with the operation command. The user can make the product inside the moving mobile object. In short, the user can make the product using the mobile object that travels autonomously.

Thus, since the user can make a product while the mobile object travels via the location of the article, the user does not need to prepare an article necessary for making the product by itself. Even when the user does not know where to find a necessary article, the mobile object brings the user to the place where the article is available. This saves a trouble of finding the article. Moreover, since the user can make the product while moving, time can also be saved.

The information processing apparatus may further include a storage unit that stores the information regarding the article corresponding to the product.

It is possible to know in advance an article necessary for making a product. Accordingly, when the storage unit stores the necessary article in advance, the information regarding the article corresponding to the product can swiftly be obtained.

The control unit may generate the operation command such the mobile object travels via the location in accordance with an order of making the product.

At the time of making products, some products may be completed for the first time when they are made in a predetermined order. More specifically, some products are adapted to be made in the predetermined order, such as a predetermined cooking order, a predetermined order of mounting components, or a predetermined processing order. In such cases, when the mobile object is moved in a predetermined order, the article can be obtained in the predetermined order, and the product can also be made in the predetermined order. The order is determined depending on the products.

When there is a plurality of combinations of the articles corresponding to the product, the control unit may output a request for selecting one combination out of the combinations.

In this case, the user itself can select, out of a plurality of articles, the article that matches the user's preference. Accordingly, the product can be made with the article matching the user's need. A request for selecting one combination may be output to a terminal possessed by the user, or may be output to the mobile object.

The control unit may control a prescribed output unit to output a method of making the product.

As a consequence, even when the user does not know the method of making the product, the user can make the product based on the method of making the product output to the output unit. Therefore, an opportunity that the user uses the service can be increased. The prescribed output unit is an output unit of the mobile object or an output unit of the terminal possessed by the user, for example. The method may be output as an image (static image or dynamic image), or may be output as voice.

Hereinafter, the embodiments will be described with reference to the drawings. The configuration of the following embodiments is illustrative, and the configuration of the embodiments is not intended to limit the present disclosure. The following embodiments may be combined as much as possible.

First Embodiment

FIG. 1 shows the schematic configuration of an autonomous driving system 1 according to the embodiment. In the autonomous driving system 1 shown in FIG. 1, when a first user makes a request of making a product through a first terminal 20A, the first user itself can make the product in a vehicle 10. The vehicle 10 provides the place to make the product, while procuring an article or articles such as ingredients, components, and tools necessary in making the product. In response to the request made by the first user, a server 30 selects an article or articles used when the product stated in the request is made. Hereinafter, a dish is mainly described as an example of "product", and an ingredient for the dish and cookware are mainly described as an example of "article." However, "product" and "article" are not limited to these. The server 30 generates an operation command of the vehicle 10 such that the vehicle 10 travels via the location of an ingredient or cookware. The operation command is generated such that the first user rides on the vehicle 10 at a boarding point, the vehicle 10 travels via each route point to procure an ingredient of the dish and cookware, and then after the dish is finished, the first user leaves the vehicle 10 at an alighting point. The generated operation command is transmitted to the vehicle 10 from the server 30. The vehicle 10 that received the operation command travels autonomously in accordance with the operation command.

The autonomous driving system 1 includes the vehicle 10, the first terminal 20A, a second terminal 20B, and the server 30, for example. There may be two or more vehicles 10 instead of one illustrated in FIG. 1. The vehicle 10 is a mobile object that can travel autonomously based on an operation command generated by the server 30. The vehicle 10 has a facility that enables the user to make a requested dish. For example, heat cooking devices and kitchen knives may be mounted in advance on the vehicle 10 that is adapted for cooking. In the case of making a product other than a dish, a facility necessary for making the product is mounted on the vehicle 10.

The first user in FIG. 1 is a user who operates the first terminal 20A and who requests riding on the vehicle 10 for making a dish from the server 30. The first user is also a user who rides on the vehicle 10 and makes a dish. In accordance with a dish input into the first terminal 20A by the first user, the server 30 selects an ingredient or ingredients and cookware used for the dish. The server 30 generates an operation command such that the vehicle 10 travels via the location or locations of the ingredients and cookware. There may be two or more first users. In accordance with the number of the first users, there may be two or more first terminals 20A. The user may make a dish when the vehicle 10 stops at a route point, or may make a dish when the vehicle 10 travels toward a next route point.

The second user in FIG. 1 is a user who operates the second terminal 20B and who relates to an article used for making a requested dish. The second user is, for example, a user who provides an ingredient of the dish and a user who provides cookware. There are also two or more second users. In accordance with the number of the second users, there are also two or more second terminals 20B.

The vehicle 10, the first terminal 20A, the second terminal 20B, and the server 30 are mutually connected through a network N1. The network N1 is, for example, a worldwide public communication network such as the Internet. A wide area network (WAN) or other communication networks may also be adopted. The network N1 may also include telephone communication networks such as cellular phone communication networks, and wireless communication networks such as WiFi.

Outline of Autonomous Driving System

Figure 2:
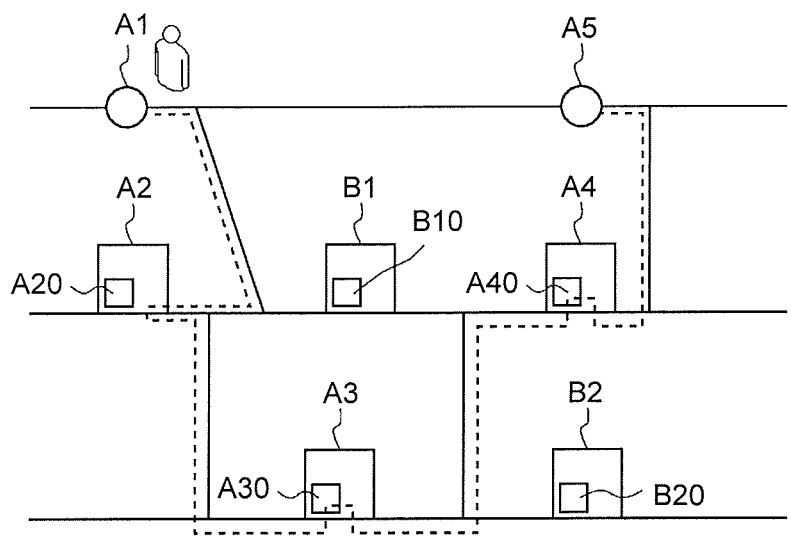
FIG. 2 is an explanatory view about a moving route of a vehicle at the time of making a dish.

The outline of the autonomous driving system according to the present embodiment will be described. FIG. 2 is an explanatory view about a moving route of the vehicle 10 at the time of making a dish. In FIG. 2, the vehicle 10 travels via route points A2, A3, A4 in order from a boarding point A1, and moves to an alighting point A5. Reference numerals B1, B2 are not a route point through which the vehicle 10 travels. The boarding point A1 is the point where the first user rides on the vehicle 10. The boarding point A1 is specified by the first user. The alighting point A5 is the point where the first user leaves the vehicle 10. The alighting point A5 is specified by the first user. Before moving to the boarding point A1, the vehicle 10 may be parked at a prescribed place, or may travels on a prescribed route.

In FIG. 2, the numerals A20, A30, A40, B10, B20 represent ingredients or cookware of the dish present in respective points. For example, the numerals B10, B20 represent ingredients or cookware that are not used when the first user makes a requested dish though they are used when other dishes are made. Hence, the points B1, B2 are excluded from the route points of the vehicle 10. Here, FIG. 2 shows the case where all the ingredients and cookware A20, A30, A40 are needed for making the dish, and they are needed in order of A20, A30, A40. In short, the vehicle 10 needs to move from the boarding point A1 to the alighting point A5 after traveling through the respective route points A2, A3, A4 in order.

For example, when the numerals A20, A40 represent ingredients of the dish, and the numeral A30 represents cookware for preparing the ingredient A20, the first user performs preliminary arrangements of the ingredient A20 before the vehicle 10, which has obtained the ingredient A20 at A2, arrives at A3. When the cookware A30 is obtained at A3, the user cooks the ingredient A20 using the cookware A30. The user performs cooking until the vehicle 10 moves to A4. At A4, the user obtains the ingredient A40 to be added as a finishing touch on the dish. The first user then finishes the dish using the ingredient A40 until the vehicle 10 arrives at the alighting point A5.

The server 30 generates the operation command such that the vehicle 10 travels via A1, A2, A3, A4, A5 in this order. The operation command may include a moving route where the vehicle 10 travels via A1, A2, A3, A4, A5 in this order. The first user takes the completed dish home when alighting from the vehicle at the alighting point A5.

Hardware Configuration

Figure 3:
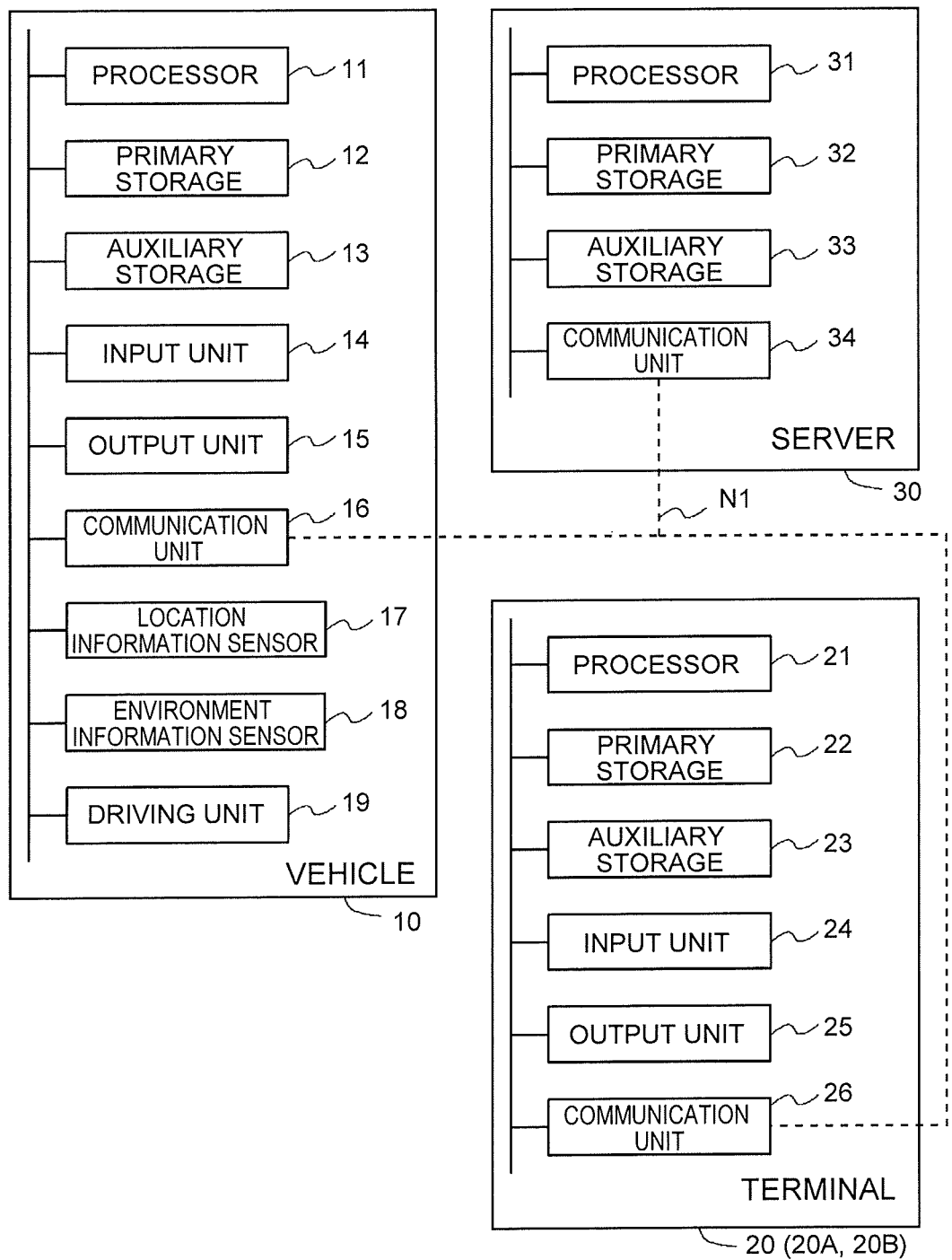
FIG. 3 is a block diagram schematically showing an example of the configuration of a vehicle, a first terminal, a second terminal, and a server that constitute the autonomous driving system according to the embodiment.

Based on FIG. 3, the hardware configuration of the vehicle 10, the first terminal 20A, the second terminal 20B, and the server 30 will be described. FIG. 3 is a block diagram schematically showing an example of the respective configuration of the vehicle 10, the first terminal 20A, the second terminal 20B, and the server 30 that constitute the autonomous driving system 1 according to the present embodiment. The first terminal 20A and the second terminal 20B are simply referred to as the terminals 20 unless otherwise distinguished from each other.

The server 30 has the configuration of a general computer. The server 30 includes a processor 31, a primary storage 32, an auxiliary storage 33, and a communication unit 34. These devices are mutually connected through a bus.

The processor 31 is formed with a central processing unit (CPU), a digital signal processor (DSP), or the like. The processor 31 controls the server 30 to perform computations of various information processing. The processor 31 is an example of "control unit." The primary storage 32 is formed with a random access memory (RAM), a read only memory (ROM), or the like. The auxiliary storage 33 is formed with an erasable programmable ROM (EPROM), a hard disk drive (HDD), a removable medium, or the like. The auxiliary storage 33 stores an operating system (OS), various programs, various tables, and the like. The auxiliary storage 33 is an example of "storage unit." The processor 31 loads the programs stored in the auxiliary storage 33 to a work area of the primary storage 32, and executes the loaded programs. Through execution of the programs, the respective component units are controlled. Thus, the server 30 implements the functions corresponding to prescribed purposes. The primary storage 32 and the auxiliary storage 33 are recording media readable with a computer. The server 30 may be a single computer, or may be a device made up of a plurality of computers in cooperation. The information stored in the auxiliary storage 33 may be stored in the primary storage 32. The information stored in the primary storage 32 may be stored in the auxiliary storage 33.

The communication unit 34 is means for establishing communication with the vehicle 10, the first terminal 20A, and the second terminal 20B via the network N1. The communication unit 34 is, for example, a local area network (LAN) interface board, or a wireless communication circuit for wireless communication. The LAN interface board or the wireless communication circuit is connected to the network N1.

Although a series of processes executed in the server 30 can also be executed by hardware, the processes can also be executed by software. The hardware configuration of the server 30 is not limited to the configuration shown in FIG. 3. Some or all the component members of the server 30 may be mounted on the vehicle 10.

Description is now given of the vehicle 10. The vehicle 10 includes a processor 11, a primary storage 12, an auxiliary storage 13, an input unit 14, an output unit 15, a communication unit 16, a location information sensor 17, an environment information sensor 18, and a driving unit 19. These devices are mutually connected through a bus. Since the processor 11, the primary storage 12, and the auxiliary storage 13 are the same as the processor 31, the primary storage 32, and the auxiliary storage 33 of the server 30, the description thereof is omitted.

The input unit 14 is means for receiving an input operation performed by the user. Examples of the input unit 14 includes a touch panel, and a push button. The output unit 15 is means for presenting information to the user. Examples of the output unit 15 include a liquid crystal display (LCD), an electro luminescence (EL) panel, a speaker, and a lamp. The input unit 14 and the output unit 15 may be configured as one touch panel display. For example, the first user who uses the vehicle 10, or a user who manages the vehicle 10 can use the input unit 14 and the output unit 15. The communication unit 16 is communication means for connecting the vehicle 10 to the network N1. The communication unit 16 is a circuit for establishing communication with other apparatuses (such as the server 30) via the network N1 by using, for example, mobile communications service (telephone communication networks such as 3rd generation (3G), and long term evolution (LTE); and wireless communication such as WiFi).

The location information sensor 17 acquires information on the location of the vehicle 10 (for example, latitude and longitude) at a prescribed cycle. For example, the location information sensor 17 is a global positioning system (GPS) reception unit, a WiFi communication unit, or the like. The information acquired with the location information sensor 17 is recorded, for example, on the auxiliary storage 13 or the like, and is transmitted to the server 30.

The environment information sensor 18 is means for sensing the state of the vehicle 10, or sensing the surrounding of the vehicle 10. Examples of the sensor for sensing the state of the vehicle 10 may include an acceleration sensor, a speed sensor, and an azimuth angle sensor. Examples of the sensor for sensing the surrounding of the vehicle 10 may include a stereoscopic camera, a laser scanner, a LIDAR, and a radar.

The driving unit 19 makes the vehicle 10 travel based on a control command generated by the processor 11. The driving unit 19 is configured by including, for example, a motor and an inverter, a brake, and a steering mechanism for driving the wheels included in the vehicle 10. When the motor, the brake, and the like are driven in accordance with the control command, autonomous travel of the vehicle 10 is implemented.

Description is now given of the terminals 20. The terminals 20 are small-size computers, such as smartphones, cellular phones, tablet computers, personal information terminals, wearable computers (such as smartwatches), and personal computers (PC), for example. The terminals 20 include a processor 21, a primary storage 22, an auxiliary storage 23, an input unit 24, an output unit 25, and a communication unit 26. These devices are mutually connected through a bus. Since the processor 21, the primary storage 22, the auxiliary storage 23, the input unit 24, the output unit 25, and the communication unit 26 are the same as the processor 11, the primary storage 12, the auxiliary storage 13, the input unit 14, the output unit 15, and the communication unit 16 of the vehicle 10, the description thereof is omitted. The terminals 20 may each be a single computer, or may be a device made up of a plurality of computers in cooperation. Some of the component members of the first terminal 20A may be mounted on the vehicle 10.

Functional Configuration: Server

Figure 4:
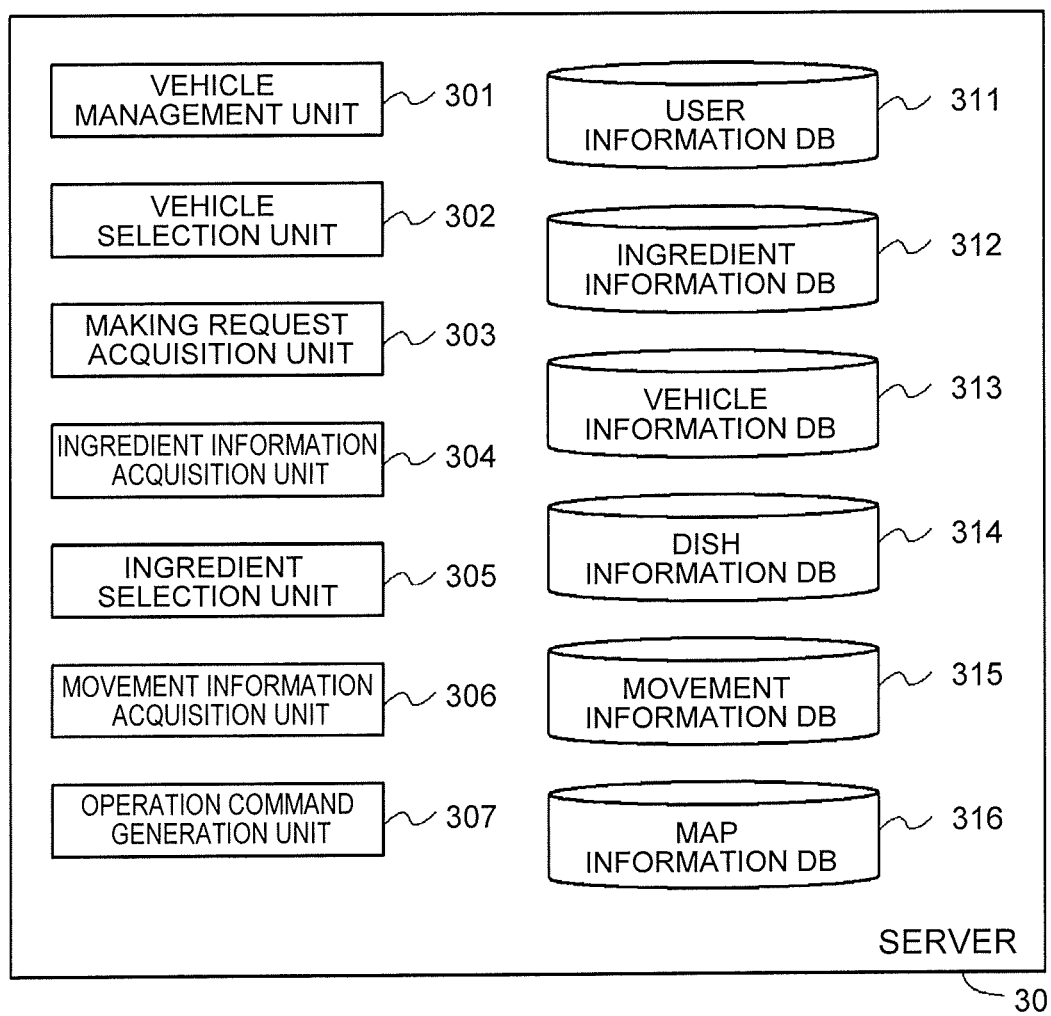
FIG. 4 shows an example of a functional configuration of the server.

FIG. 4 shows an example of the functional configuration of the server 30. The server 30 includes, as functional components, a vehicle management unit 301, a vehicle selection unit 302, a making request acquisition unit 303, an ingredient information acquisition unit 304, an ingredient selection unit 305, a movement information acquisition unit 306, an operation command generation unit 307, a user information DB 311, an ingredient information DB 312, a vehicle information DB 313, a dish information DB 314, a movement information DB 315, a map information DB 316, and an image information DB 317. The vehicle management unit 301, the vehicle selection unit 302, the making request acquisition unit 303, the ingredient information acquisition unit 304, the ingredient selection unit 305, the movement information acquisition unit 306, and the operation command generation unit 307 are functional components provided when, for example, the processor 31 of the server 30 executes various programs stored in the auxiliary storage 33.

The user information DB 311, the ingredient information DB 312, the vehicle information DB 313, the dish information DB 314, the movement information DB 315, the map information DB 316, and the image information DB 317 are, for example, relational databases constructed when programs of a database management system (DBMS) executed by the processor 31 manage the data stored in the auxiliary storage 33. Some of the functional components of the server 30 or some of the processes thereof may be executed by other computers connected to the network N1.

The vehicle management unit 301 manages various information regarding the vehicle 10. The vehicle management unit 301 acquires and manages the location information transmitted from the vehicle 10 at a prescribed cycle, or the location information transmitted from the vehicle 10 in response to a request from the server 30, for example. The vehicle management unit 301 stores the location information in association with a vehicle ID in the vehicle information DB 313. The vehicle management unit 301 manages the working state of the vehicle 10. The working state is the information for determining whether the vehicle 10 is in an active state for making a dish or in a standby state where the vehicle 10 is not active for making a dish. The vehicle management unit 301 stores the working state in association with the vehicle ID in the vehicle information DB 313. The working state may be transmitted from the vehicle 10 at a prescribed cycle, for example. The vehicle management unit 301 may determine the working state based on the information on the location of the vehicle 10. For example, when the current location of the vehicle 10 is a base of the vehicle 10, the vehicle management unit 301 may determine that the vehicle 10 is in the standby state. When the current location of the vehicle 10 is other than the base of the vehicle 10, the vehicle management unit 301 may determine that the vehicle 10 is in the active status. The vehicle management unit 301 also manages the information regarding the dishes that the vehicle 10 can support (supportable dishes). The supportable dishes are the information acquired in advance for every vehicle 10 through, for example, the input unit 14 of the vehicle 10, the terminal connected to the server 30, and the terminal connected to the network N1. The vehicle management unit 301 stores the supportable dishes that each of the vehicles 10 can support in association with the vehicle ID in the vehicle information DB 313.

The vehicle selection unit 302 selects the vehicle 10 for making a dish based on, for example, prescribed conditions.

The prescribed conditions herein refer to the conditions under which a dish can be made in the vehicle 10. For example, examples of the prescribed conditions include that the vehicle 10 supports making of a dish requested by the first user, and that the vehicle 10 is in the standby state. In short, the vehicle selection unit 302 selects, as the vehicle 10 used for making a dish, the vehicle 10 that supports making of the dish requested by the first user and that is in the standby state.

The making request acquisition unit 303 acquires a making request transmitted from the first terminal 20A of the first user, for example. The making request is the information regarding the first user's request for making a dish while riding on the vehicle 10. The making request includes information on the dish desired by the first user. The making request is generated in the first terminal 20A, when the first user performs prescribed input on the input unit 24 of the first terminal 20A.

The ingredient information acquisition unit 304 acquires information, such as information indicating whether or not an ingredient or cookware is selectable, and information regarding the location of the ingredient or cookware, from the second terminal 20B of the second user. These pieces of information (ingredient information) may be transmitted to the server 30 from the second terminal 20B based on a request from the server 30, or may be transmitted to the server 30 from the second terminal 20B at a prescribed cycle. These pieces of information include information regarding the user ID associated with the second user and the ingredient ID associated with the ingredient or cookware. The user ID is an identifier particular to each user. The ingredient ID is an identifier particular to each ingredient and cookware. In the present embodiment, the ID corresponding to cookware is also referred to as the ingredient ID for the sake of convenience. The ingredient information is transmitted to the server 30 from the second terminal 20B, and is registered in the server 30. Upon reception of the ingredient information, the ingredient information acquisition unit 304 stores the ingredient information in the ingredient information DB 312 described later.

The ingredient selection unit 305 selects an ingredient or ingredients and cookware for making a dish. The ingredient selection unit 305 acquires information regarding the ingredients and cookware necessary for making a dish with reference to the dish information DB 314. The ingredient selection unit 305 then selects a selectable ingredient and cookware out of the acquired ingredients and cookware, with reference to the ingredient information DB 312. Here, when the same ingredient or cookware can be supplied from a plurality of second users, ingredient selection unit 305 may select one ingredient or cookware in accordance with a prescribed rule. For example, the prescribed rule may be the rule where the ingredient or cookware is determined based on information on price, quality, and the like. For example, the most inexpensive ingredient or cookware may also be selected. The information on price or quality may be associated with the user ID and the ingredient ID, and be acquired from the second terminal 20B in advance, or may be acquired based on past data stored in the server 30. The server 30 may select the ingredient and cookware such that the moving route of the vehicle 10 becomes the shortest. For example, when a plurality of combinations of the ingredients and cookware is present, the moving route may be generated for each of the combinations. The ingredients and the cookware, included in the combination corresponding to the shortest moving route among the combinations, may be selected.

The movement information acquisition unit 306 acquires movement information regarding a user who wishes to make a dish in the vehicle 10. The movement information is the information transmitted to the server 30 from the first terminal 20A together with a making request. The movement information relates to a boarding point, an alighting point, and moving date and time of the first user. Upon acquisition of the movement information, the movement information acquisition unit 306 stores the movement information in the movement information DB 315.

The operation command generation unit 307 generates an operation command such that the vehicle 10 departs from the boarding point of the first user, travels via route points that are locations of the ingredients and cookware selected by the ingredient selection unit 305, and arrives at the alighting point of the first user, for example. The operation command is determined such that the vehicle 10 travels via the respective route points in accordance with the order of making a dish. The order of making a dish is associated with the ingredient ID. The operation command generation unit 307 according to the present embodiment generates a moving route based on the map information stored in the map information DB 316 described later. The moving route is generated to be a route in conformity with a predetermined rule, such as a route where the vehicle 10 moves a shortest distance, and a route where the vehicle 10 moves for a shortest time. The operation command generation unit 307 transmits an operation command including the moving route to the vehicle 10. The operation command includes image information described later.

The user information DB 311 is formed of the user information regarding the first user and the user information regarding the second user that are stored in the above-described auxiliary storage 33. In the user information DB 311, each user is associated with corresponding user information. The user information includes, for example, user ID, name, and address that are associated with the first user and the second user.

The ingredient information DB 312 is formed of the above-described ingredient information stored in the auxiliary storage 33. In the ingredient information DB 312, the user ID of the second user is associated with the ingredient ID. Here, the configuration of the ingredient information stored in the ingredient information DB 312 will be described based on FIG. 5. FIG. 5 illustrates a table configuration of the ingredient information. The ingredient information table includes fields of user ID, ingredient ID, selectability, and location. Input in the user ID field is the information for identifying the second user. Input in the ingredient ID field is the information for identifying an ingredient or cookware. A plurality of ingredient IDs may correspond to one user ID. Input in the selectability field is the information indicating whether an ingredient or cookware corresponding to the pertinent ingredient ID is selectable. For example, when there is no stock of the ingredient or cookware, "unselectable" is input into the selectability field to indicate that the ingredient or cookware is unselectable. On the contrary, when there is a stock of the ingredient or cookware, "selectable" is input into the selectability field to indicate that the ingredient or cookware is selectable. The selectability is registered through the second terminal 20B. Input in the location field is the location of the pertinent ingredient or cookware. The location of the ingredient or cookware is registered through the second terminal 20B as a place where the vehicle 10 heads for.

The vehicle information DB 313 is formed of vehicle information stored in the auxiliary storage 33. In the vehicle information DB 313, the vehicle ID and the vehicle information are associated with each other. Here, the configuration of the vehicle information stored in the vehicle information DB 313 will be described based on FIG. 6. FIG. 6 illustrates the table configuration of the vehicle information. The vehicle information table includes fields of vehicle ID, location information, working state, and supportable dish. Input in the vehicle ID field is identification information for identifying the vehicle 10. Input in the location information field is the location information transmitted from the vehicle 10. The location information is the information indicating the current location of the vehicle 10. Input in the working state field is the information indicating whether the vehicle 10 is active for making a dish or in standby. The working state may be transmitted from the vehicle 10, for example. Input in the supportable dish field is identification information for identifying the dishes corresponding to the vehicle 10. In short, the information indicating the dishes that the vehicle 10 can support is input into the supportable dish field.

The dish information DB 314 is formed of information on the ingredients or cookware corresponding to the dishes (hereinafter, simply referred to as "dish information") stored in the auxiliary storage 33. Here, the configuration of the dish information stored in the dish information DB 314 will be described based on FIG. 7. FIG. 7 illustrates the table configuration of the dish information. The dish information table includes fields of dish ID, and ingredient ID. Input in the dish ID field is the information for identifying each dish. Input in the ingredient ID field is the information for identifying an ingredient and cookware necessary for making a pertinent dish. The ingredient ID input into the ingredient ID field is associated with the order that the ingredients and cookware are used when the dish is made. In short, in each of the fields shown in FIG. 7, the ingredient ID field is generated such that the ingredients or cookware are provided in order of the ingredient ID #1, #2, #3 . . . .

The movement information DB 315 is formed of movement information stored in the auxiliary storage 33. In the movement information DB 315, the first user and the movement information are associated with each other. Here, the configuration of the movement information stored in the movement information DB 315 will be described based on FIG. 8. FIG. 8 illustrates the table configuration of movement information regarding the first user. The movement information table of the first user includes fields of user ID, boarding point, alighting point, and moving day and time. Input in the user ID field is the information for identifying the first user. Input in the boarding point field is the information indicating the place where the first user wishes to board the vehicle 10. Input in the alighting point field is the information indicating the place where the first user wishes to leave the vehicle 10. Input in the moving day and time field is the information indicating the day and time when the first user wishes to board the vehicle 10. The boarding point, the alighting point, and the moving day and time may be input through the input unit 24 of the first terminal 20A by the first user when a making request is generated, or may be registered in advance in the first terminal 20A or the server 30 before the making request is generated.

The map information DB 316 stores map data and map information that includes point of interest (POI) information, such as characters and photographs indicating the features of each point on the map data. The map information DB 316 may be provided from other systems connected to the network N1, such as a geographic information system (GIS).

Figures 9, 10:
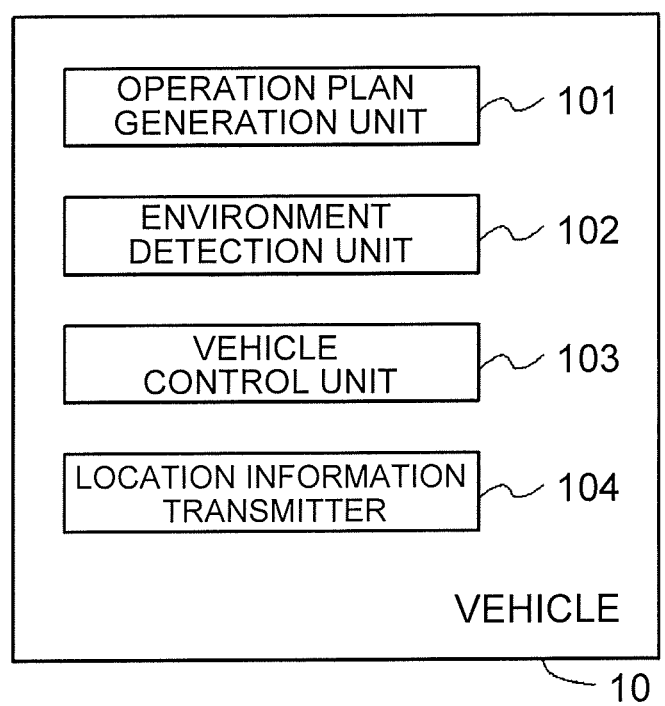
FIG. 9 illustrates the table configuration of image information.
FIG. 10 illustrates one example of the functional configuration of the vehicle.

The image information DB 317 is formed of image information corresponding to an ingredient or cookware of each dish (hereinafter, simply referred to as "image information") stored in the auxiliary storage 33. Here, the configuration of the image information stored in the image information DB 317 will be described based on FIG. 9. FIG. 9 illustrates the table configuration of the image information. The image information includes fields of dish ID and image ID. Input in the dish ID field is the information for identifying each dish. Input in the image ID field is the information for identifying images corresponding to the ingredients and cookware, the images showing a cooking method. The image ID input into the image ID field is associated with the order when the dish is made. In short, in each of the fields shown in FIG. 9, the image ID field is generated such that the images are provided in order of the image ID #1, #2, #3 . . . . The order of image ID (#1, #2, #3 . . . ) corresponds to the order of ingredient ID (#1, #2, #3 . . . ) in FIG. 7. For example, at the time of cooking a dish having a dish ID of C01 in FIG. 7, a cooking method of a first ingredient A20 corresponds to an image indicated by an image ID of G20. The image corresponding to the image ID is associated with the order of image ID, and is transmitted to the vehicle 10 together with the operation command.

Functional Configuration: Vehicle

FIG. 10 illustrates an example of the functional configuration of the vehicle 10. The vehicle 10 includes an operation plan generation unit 101, an environment detection unit 102, a vehicle control unit 103, and a location information transmitter 104 as functional components. The operation plan generation unit 101, the environment detection unit 102, the vehicle control unit 103, and the location information transmitter 104 are functional components provided when, for example, the processor 11 of the vehicle 10 executes various programs stored in the auxiliary storage 13.

The operation plan generation unit 101 acquires an operation command from the server 30, and generates an operation plan of the own vehicle. Based on the operation command given from the server 30, the operation plan generation unit 101 calculates a moving route of the vehicle 10, and generates an operation plan for moving on the moving route.

Based on the data acquired by the environment information sensor 18, the environment detection unit 102 detects the environment around the vehicle 10 necessary for autonomous travel. Examples of detection targets include the number and location of lanes, the number and location of other movable bodies present around the own vehicle, the number and location of obstacles (for example, pedestrians, bicycles, structures, buildings, and the like) present around the own vehicle, the structure of roads, and road signs. However, the detection targets are not limited to these. The detection targets may be any objects as long as the objects are necessary for autonomous traveling. For example, when the environment information sensor 18 is a stereoscopic camera, objects around the vehicle 10 are detected by performing image processing of image data imaged by the stereoscopic camera. The data on the environment around the vehicle 10 (hereinafter, environment data) detected by the environment detection unit 102 is transmitted to the vehicle control unit 103 described later.

The vehicle control unit 103 generates a control command for controlling autonomous travel of the vehicle 10, based on the operation plan generated by the operation plan generation unit 101, the environment data generated by the environment detection unit 102, and the location information regarding the vehicle 10 acquired by the location information sensor 17. For example, the vehicle control unit 103 generates a control command to control the vehicle 10 to travel along a prescribed route while preventing obstacles from entering into a prescribed safety area around the own vehicle 10. The generated control command is transmitted to the driving unit 19. As a method of generating the control command for achieving autonomous movement of the vehicle 10, a publicly-known method may be adopted. The vehicle control unit 103 outputs to the output unit 15 the images received from the server 30 in accordance with the order of the image ID. Whenever the vehicle 10 arrives at a route point, the vehicle control unit 103 displays the image corresponding to an ingredient and cookware obtained at the route point, for example, on a display. The vehicle control unit 103 recognizes the order of the respective route points, and outputs to the output unit 15 images corresponding to the order of the respective route points. The image received from the server 30 is stored in the auxiliary storage 13.

The location information transmitter 104 transmits the location information acquired from the location information sensor 17 to the server 30 through the communication unit 16. The timing when the location information transmitter 104 transmits the location information can properly be set. For example, the location information transmitter 104 may periodically transmit the location information, transmit in accordance with the timing of transmitting some other information to the server 30, or may transmit in response to a request from the server 30. The location information transmitter 104 transmits to the server 30 the location information together with the identification information (vehicle ID) for uniquely identifying the own vehicle. The vehicle ID for identifying the vehicle 10 is allocated in advance.

Functional Configuration: First Terminal

Figure 11:
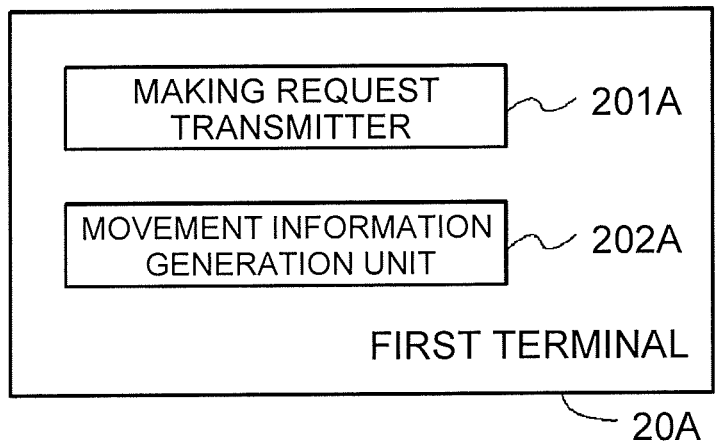
FIG. 11 illustrates an example of the functional configuration of the first terminal.

FIG. 11 illustrates an example of the functional configuration of the first terminal 20A. The first terminal 20A includes a making request transmitter 201A and a movement information generation unit 202A as functional components. The making request transmitter 201A and the movement information generation unit 202A are functional components provided when, for example, the processor 21 of the first terminal 20A executes various programs stored in the auxiliary storage 23.

The making request transmitter 201A displays on the output unit 25 an operation screen for prompting input of a making request, and generates a making request corresponding to the input on the input unit 24 by the first user. The making request transmitter 201A outputs an icon, or the like, to request making a dish while riding on the vehicle 10 on a touch panel display of the first terminal 20A, for example. When the first user clicks the icon, the making request transmitter 201A generates a making request. The making request includes information on the dish that the first user desires to make, and the movement information. The making request transmitter 201A transmits to the server 30 the generated making request in association with the user ID.

The movement information generation unit 202A generates the movement information regarding the first user. The movement information generation unit 202A displays on the output unit 25 an operation screen for prompting input of movement information, and generates movement information corresponding to the input on the input unit 24 by the first user. The making request transmitter 201A transmits to the server 30 the generated movement information together with the making request. The first user may input the movement information using the input unit 24 in advance, and then store the input movement information in the auxiliary storage 23 of the first terminal 20A. The movement information generation unit 202A may further generate movement information based on the data stored in the auxiliary storage 23. When the first terminal 20A includes the global positioning system (GPS), the first terminal 20A may receive electric waves transmitted from the satellites when the movement information generates to detect the location of the first terminal 20A. The movement information generation unit 202A may use the location of the first terminal 20A as the boarding point of the first user.

Figure 12:
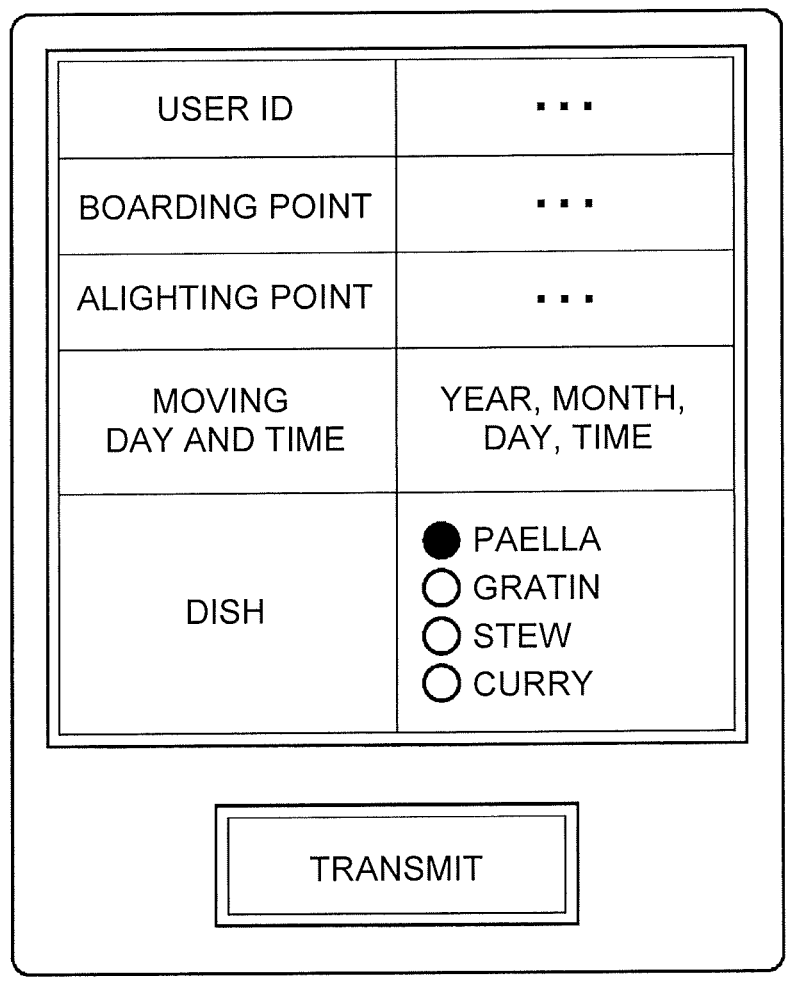
FIG. 12 shows an example of a screen displayed on an output unit of the first terminal, when the first user makes a request of making a dish while riding on the vehicle.

FIG. 12 shows an example of a screen displayed on the output unit 25 of the first terminal 20A, when the first user makes a request of making a dish while riding on the vehicle 10. The user inputs the user ID, boarding point, alighting point, and moving day and time by character input. The first user selects a desired dish out of "dishes" by clicking the icons of buttons prepared in advance. Then, when the user clicks "Transmit", the making request transmitter 201A generates a making request, and transmits the making request to the server 30.

Functional Configuration: Second Terminal

Figure 13:
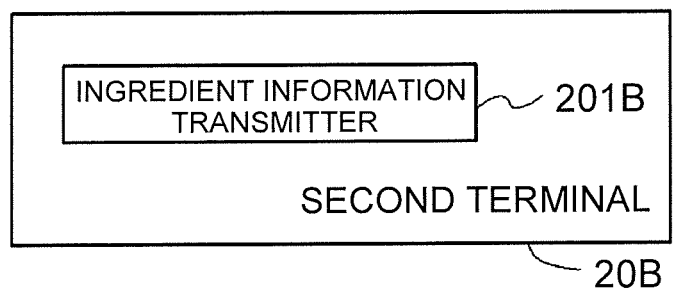
FIG. 13 shows an example of the functional configuration of the second terminal.

FIG. 13 illustrates an example of the functional configuration of the second terminal 20B. The second terminal 20B includes an ingredient information transmitter 201B as a functional component. The ingredient information transmitter 201B is a functional component provided when, for example, the processor 21 of the second terminal 20B executes various programs stored in the auxiliary storage 23. The ingredient information transmitter 201B outputs, an icon, or the like, indicating whether an ingredient or cookware is selectable on a touch panel display of the second terminal 20B, for example. When the second user clicks the icon, the ingredient information transmitter 201B acquires the information indicating whether or not the ingredient or cookware is selectable. When there is no stock of the ingredient or cookware, the second user inputs that the pertinent ingredient or cookware is unselectable.

The ingredient information transmitter 201B also acquires information regarding the location of the ingredient and cookware through the input unit 24. The second user inputs the information regarding the location (for example, address) of the ingredient and cookware in advance through the input unit 24, and stores the information in the auxiliary storage 23 of the second terminal 20B. The ingredient information transmitter 201B transmits these pieces of ingredient information in association with the user ID and the ingredient ID to the server 30. The timing when the ingredient information transmitter 201B transmits the ingredient information can properly be set. For example, the ingredient information transmitter 201B may transmit the ingredient information when the ingredient information is changed, may transmit the ingredient information periodically, or may transmit the ingredient information in response to a request from the server 30. Once the first information regarding the location of the ingredient or cookware is registered in the server 30, the ingredient information transmitter 201B may transmit the information only when the information is changed next time and thereafter.

Figure 14:
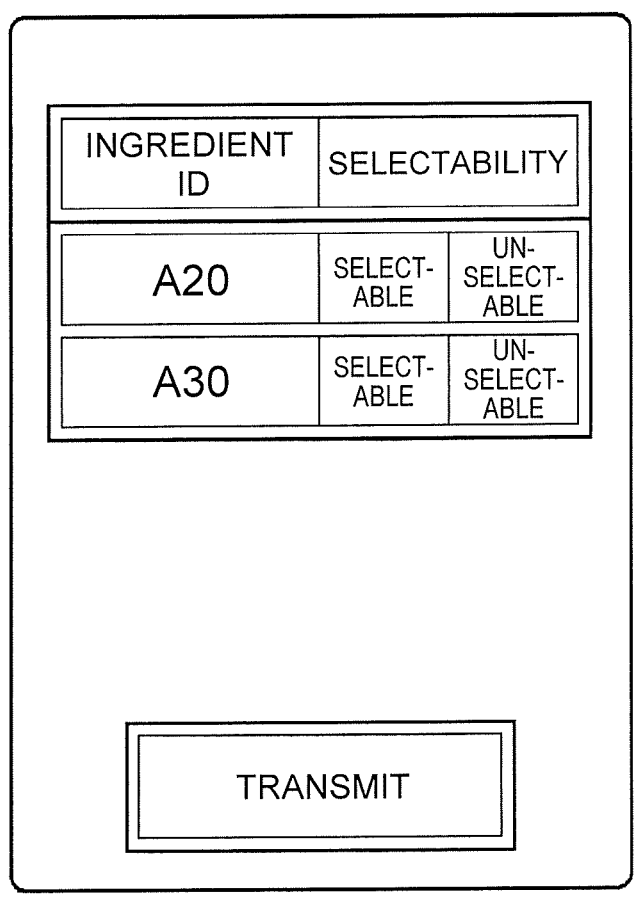
FIG. 14 shows an example of a screen displayed on an output unit of the second terminal, when to second user registers the selectability of ingredients or cookware.

FIG. 14 shows an example of a screen displayed on the output unit 25 of the second terminal 20B, when the second user registers the selectability of an ingredient or cookware. When the second user selects the selectability corresponding to each "ingredient ID" by clicking one of "selectable" or "unselectable", and then clicks "Transmit", the ingredient information transmitter 201B generates ingredient information.

Process Flow: Server

Figure 15:
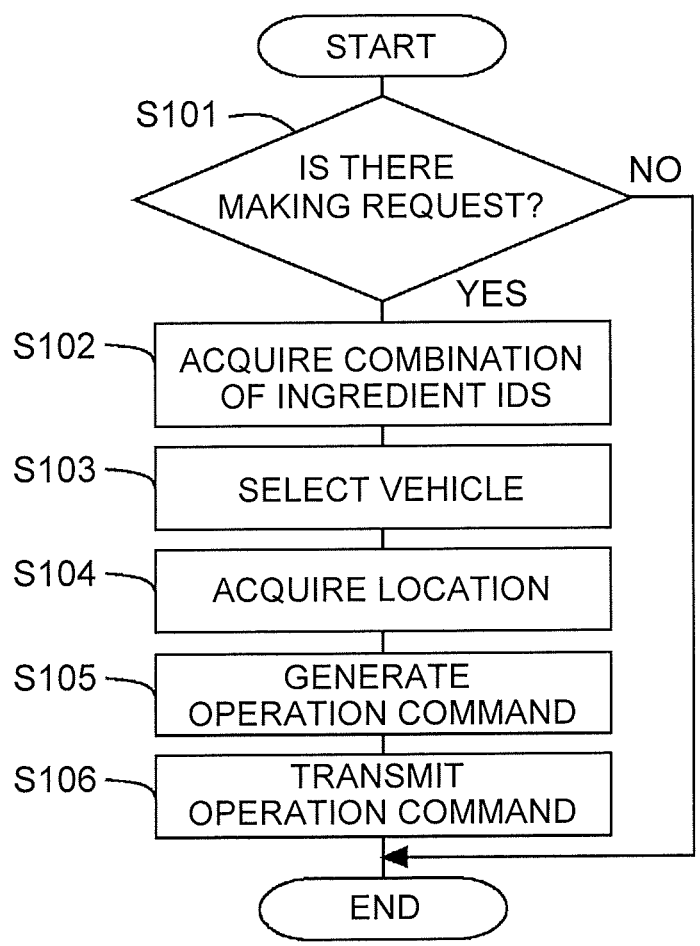
FIG. 15 is an example a flowchart of a process of transmitting an operation command according to a first embodiment.

Description is now given of the process that the server 30 transmits an operation command to the vehicle 10. FIG. 15 is an example of the flowchart of the process of transmitting an operation command according to the embodiment. The process shown in FIG. 15 is executed by the processor 31 of the server 30 every prescribed time. Here, it is assumed that the server 30 has already received from the vehicle 10, the first terminal 20A, and the second terminal 20B the information necessary to construct the ingredient information DB 312, the vehicle information DB 313, the dish information DB 314, and the movement information DB 315.

In step S101, the making request acquisition unit 303 determines whether a making request is received from the first terminal 20A. When positive determination is made in step S101, the process proceeds to step S102. When negative determination is made, the present routine is ended.

In step S102, the ingredient selection unit 305 acquires a combination of ingredient IDs corresponding to ingredients and cookware necessary to make a dish in the making request. The ingredient selection unit 305 accesses the dish information DB 314 and the ingredient information DB 312, and selects, out of the combinations of ingredient IDs corresponding to a dish ID in the making request, a combination of the ingredient IDs all having the selectability being "selectable".

In short, the ingredient selection unit 305 acquires from the dish information DB 314 the ingredient IDs corresponding to the dish ID of the dish in the making request. The ingredient selection unit 305 also acquires from the ingredient information DB 312 information indicating whether the selectability is "selectable" or "unselectable" for each of the acquired ingredient IDs. The ingredient selection unit 305 then selects, out of the combinations of the ingredient IDs corresponding to the dish ID of the dish in the making request, a combination of the ingredient IDs all having the selectability being "selectable." When there is no combination of the ingredient IDs all having the selectability being "selectable", the ingredient selection unit 305 may notify to the first user that the first user is unable to make a dish due to the shortage of the ingredient or cookware.

In step S103, the vehicle selection unit 302 selects the vehicle 10 for making the dish. The vehicle selection unit 302 accesses the vehicle information DB 313, and selects the vehicle 10 that supports the dish in the making request and that has the working state set to "standby."

In step S104, the operation command generation unit 307 acquires the locations corresponding to the ingredient IDs according to the combination that is acquired by the ingredient selection unit 305 in step S102 The operation command generation unit 307 acquires from the ingredient information DB 312 the locations corresponding to the user IDs associated with the ingredient IDs.

In step S105, the operation command generation unit 307 generates an operation command of the vehicle 10. The operation command generation unit 307 acquires movement information regarding the first user from the movement information DB 315, and acquires the order of making the dish from the dish information DB 314. The operation command generation unit 307 then generates a moving route of the vehicle 10 such that the vehicle 10 moves via the boarding point, the locations of the ingredients and cookware, and the alighting point in order at the moving day and time. In this case, the operation command generation unit 307 generates the moving route such that the vehicle 10 travels via the locations of the ingredients and cookware in accordance with the order of making the dish.

Then, in step S106, the operation command generation unit 307 transmits the operation command to the vehicle 10 selected in step S103. The operation command generation unit 307 transmits to the vehicle 10 images associated with the order of making the dish, together with the operation command. At the time, the operation command generation unit 307 may also access the vehicle information DB 313, and update the working state of the selected vehicle 10 to be "active"

The server 30 may transmit information indicating a request for supplying the ingredients and cookware to the second terminals 20B of the second users corresponding to the selected ingredient IDs. The server 30 may further notify the current location of the vehicle 10 to the second terminals 20B. The current location may be notified in response to the request from the second users, or may be notified every prescribed time.

Process Flow: Vehicle

Figure 16:
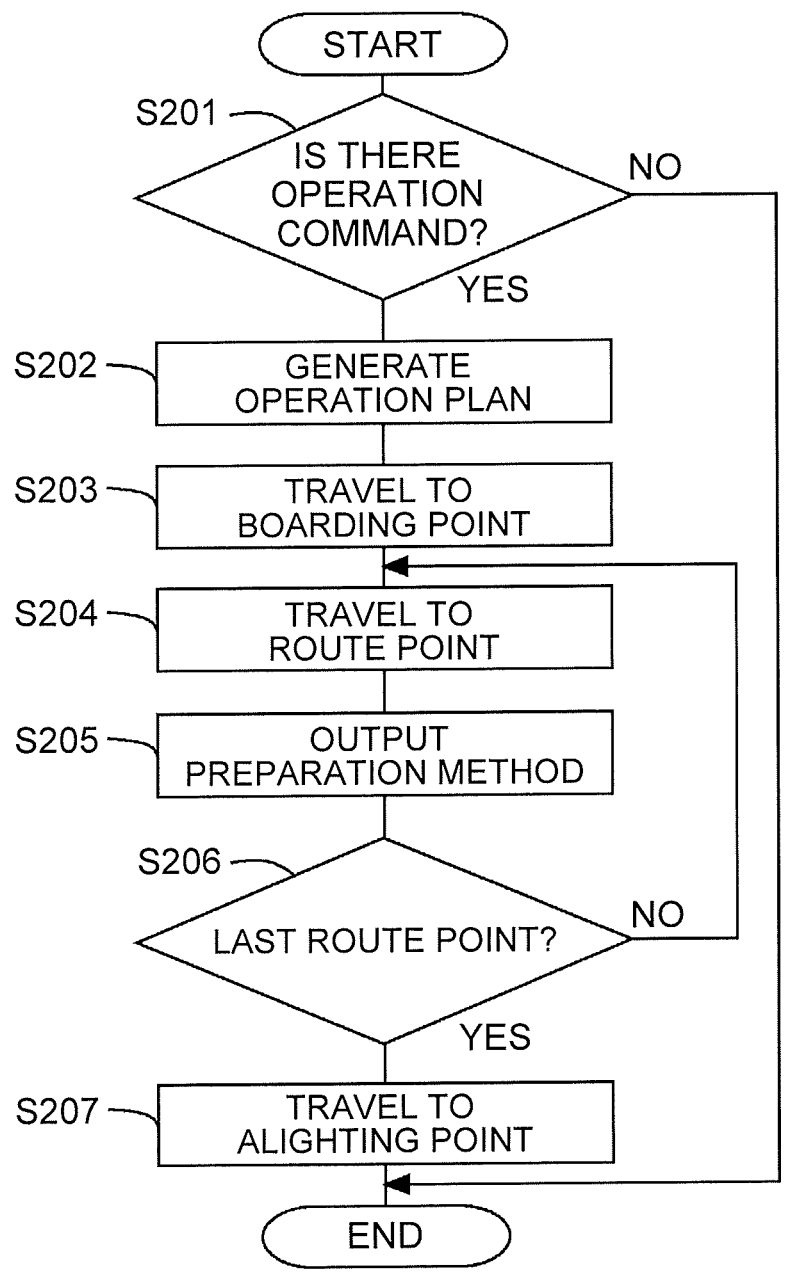
FIG. 16 is an example of the flowchart of a process of controlling the vehicle to travel according to the embodiment.

Description is now given of the process of controlling the vehicle 10 to travel. FIG. 16 is an example of the flowchart of the process of controlling the vehicle 10 to travel according to the present embodiment. The process shown in FIG. 16 is executed by the processor 11 of the vehicle 10 every prescribed time. The present flowchart is executed for the vehicle 10 in the standby state.

In step S201, the operation plan generation unit 101 determines whether or not the operation command from the server 30 is received. When positive determination is made in step S201, the process proceeds to step S202. When negative determination is made, the present routine is ended. In step S202, the operation plan generation unit 101 generates an operation plan in accordance with the operation command.

When generation of the operation plan is completed, the vehicle control unit 103 generates a control command in step S203. In accordance with the control command, the driving unit 19 is controlled, and the vehicle 10 travels to the boarding point of the first user. After the vehicle 10 arrives at the boarding point, and the first user rides on the vehicle 10, the first user itself inputs that the first user completes riding on the vehicle 10 on the input unit 14 of the vehicle 10, for example. Once the input is made, the process proceeds to step S204. When the vehicle 10 includes a human sensor or the like, the human sensor or the like may detect the first user riding on the vehicle 10.

In step S204, the vehicle control unit 103 generates a control command. In accordance with the control command, the driving unit 19 is controlled, and the vehicle 10 travels to a route point. In the route point, the first user receives an ingredient or cookware from the second user. The second user does not need to directly hand the ingredient or cookware to the first user. For example, the second user may put the ingredient or cookware on a prescribed place. After the vehicle 10 arrives at the route point, and the first user receives the ingredient or cookware, the first user inputs that the first user completes reception of the ingredient or cookware on the input unit 14 of the vehicle 10, for example. Once the input is made, the process proceeds to step S205.

In step S205, the vehicle control unit 103 controls the output unit 15 to output a cooking method corresponding to the ingredient or cookware obtained in the route point. For example, the vehicle control unit 103 displays on the display a dynamic image or a static image showing the cooking method. The vehicle control unit 103 recognizes the order of respective route points, and outputs to the output unit 15 an image corresponding to the order of the route points. Upon request from the first user, the image can be played, stopped, and replayed as many times as the first user wishes. Thus, whenever the vehicle 10 arrives at a route point, the vehicle control unit 103 outputs an image corresponding to the ingredient and cookware obtained in the route point. A voice may further be output with the image. It is noted that step S205 may be omitted. For example, in place of the cooking method being output to the output unit 15, a book or a printed material showing the cooking method may be prepared in the vehicle 10 in advance. In the present embodiment, the cooking method is output to the output unit 15 of the vehicle 10. However, the cooking method may be output to the output unit 25 of the first terminal 20A instead.

Next, in step S206, the vehicle control unit 103 determines whether or not the current location of the vehicle 10 is a final route point where the ingredient and cookware is obtained. When positive determination is made in step S206, the process proceeds to step S207. When negative determination is made, the process returns to step S204, and the vehicle 10 is controlled to travel to the next route point. In step S207, the vehicle control unit 103 controls the vehicle 10 to travel to the alighting point, and then ends the present routine.

As described in the foregoing, the present embodiment enables the first user to procure ingredients and cookware used for a dish by using the vehicle 10 that travels autonomously and to make the dish while moving by riding on the vehicle 10. Thus, since the first user can make a dish while, for example, heading home, time can be saved. In the case where the first user has no idea where to buy the ingredients for making a dish, or in the case where the first user does not have cookware, the vehicle 10 guides the first user to the places where the ingredients or cookware are available. As a result, the first user can easily make the dish. In the case where the first user does not know how to cook, the vehicle 10 can provide a cooking method. Therefore, anyone can easily enjoy cooking. Moreover, since it is not necessary to prepare the ingredients or cookware in the vehicle 10 in advance, the vehicle 10 can immediately go to the boarding point upon request from the first user. This makes it possible to shorten the time until the first user rides on the vehicle.

Second Embodiment

In a second embodiment, when a plurality of combinations of the ingredients and cookware corresponding to a dish is present, the first user selects one combination out of the combinations of the ingredients and cookware. For example, when a plurality of ingredients different in place of production or producer are present, the first user selects one ingredient out of the ingredients. For example, when a plurality of cookware different in manufacturer is present, the first user selects one cookware from them.

FIG. 17 illustrates the table configuration of the ingredient information in the ingredient information DB 312. The ingredient information table according to the present embodiment includes fields of user ID, ingredient ID, selectability, and location. Description will be mainly given of the difference from FIG. 5. In FIG. 17, input in the ingredient ID field is the information for identifying an ingredient or cookware. Reference numerals A30_1, A30_2, A30_3 are ingredient IDs corresponding to different ingredients or different cookware, though they represent mutually exchangeable ingredients or mutually exchangeable cookware. Reference numerals A30_1, A30_2, A30_3 are ingredient IDs corresponding to ingredients compatible with the ingredient or cookware having an ingredient ID of A30. When the ingredient or cookware having an ingredient ID of A30 is needed for making a dish, the first user can select one out of the ingredients or cookware having ingredient IDs of A30_1, A30_2, A30_3. The server 30 sends an inquiry to the first user about which ingredient or cookware the first user selects out of A30_1, A30_2, A30_3.

Figures 18, 19:
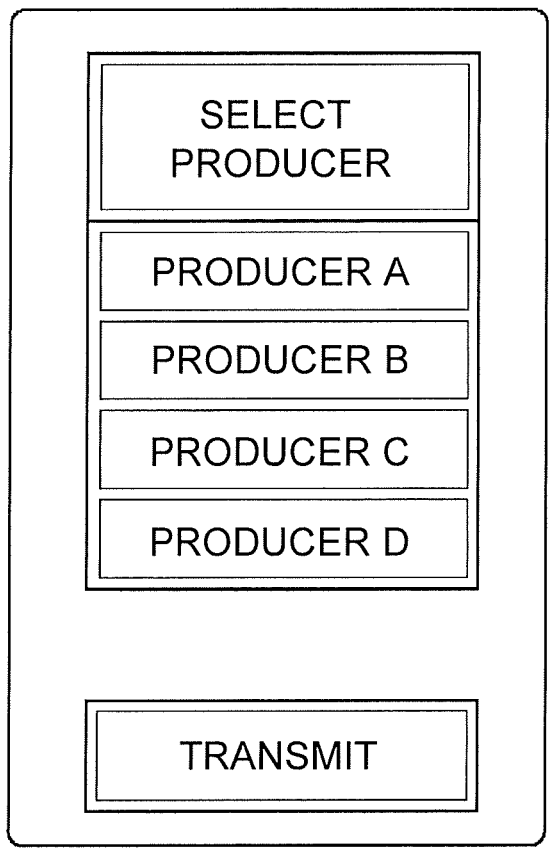
FIG. 18 shows an example of a screen displayed on the output unit of the first terminal at the time of selecting an ingredient or cookware after a making request is transmitted.
FIG. 19 illustrates the table configuration of the dish information in a dish information DB.

FIG. 18 shows an example of a screen displayed on the output unit 25 of the first terminal 20A at the time of selecting ingredients or cookware after a making request is transmitted. FIG. 18 shows the case where, for example, the first user can select the producer of an ingredient. The screen is displayed based on the information transmitted from the server 30. The first user clicks one of the producers of the ingredients, and then clicks "Transmit". Accordingly, the making request transmitter 201A transmits information regarding the input producer to the server 30. In the present embodiment, when the ingredient or cookware is selected, the screen for prompting selection is displayed on the output unit 25 of the first terminal 20A. However, the screen may be displayed on the output unit 15 of the vehicle 10 instead.

FIG. 19 illustrates the table configuration of the dish information in the dish information DB 314. The dish information table includes fields of dish ID and ingredient ID. Description will be mainly given of the difference from FIG. 7. In the case of making a dish having a dish ID of C01, an ingredient or cookware having an ingredient ID of A20 is needed in the first (#1) in a making order, an ingredient or cookware having an ingredient ID of A30 is needed in the second (#2) in the making order, and an ingredient or cookware having an ingredient ID of A40 is needed in the third (#3) in the making order. The ingredient or cookware having an ingredient ID of A30 is compatible with the ingredients or cookware having ingredient IDs of A30_1, A30_2, A30_3. The ingredient or cookware having an ingredient ID of A40 is compatible with the ingredients or cookware having ingredient IDs of A40_1, A40_2. Note that combinations of ingredients or cookware may have restriction. For example, when the first user selects A30_1, the first user is unable to select A40_2. When the first user selects A30_2 or A30_3, the first user is unable to select A40_1. In short, in the case of making a dish having a dish ID "C01" in the example shown in FIG. 19, the first user selects any one combination out of three combinations: a combination of ingredients having ingredient IDs of A20, A30_1, and A40_1 . . . ; a combination of ingredients having ingredient IDs of A20, A30_2, A40_2 . . . ; and a combination of ingredients having ingredient IDs of A20, A30_3, A40_2 . . . .

Process Flow: Server

Figure 20:
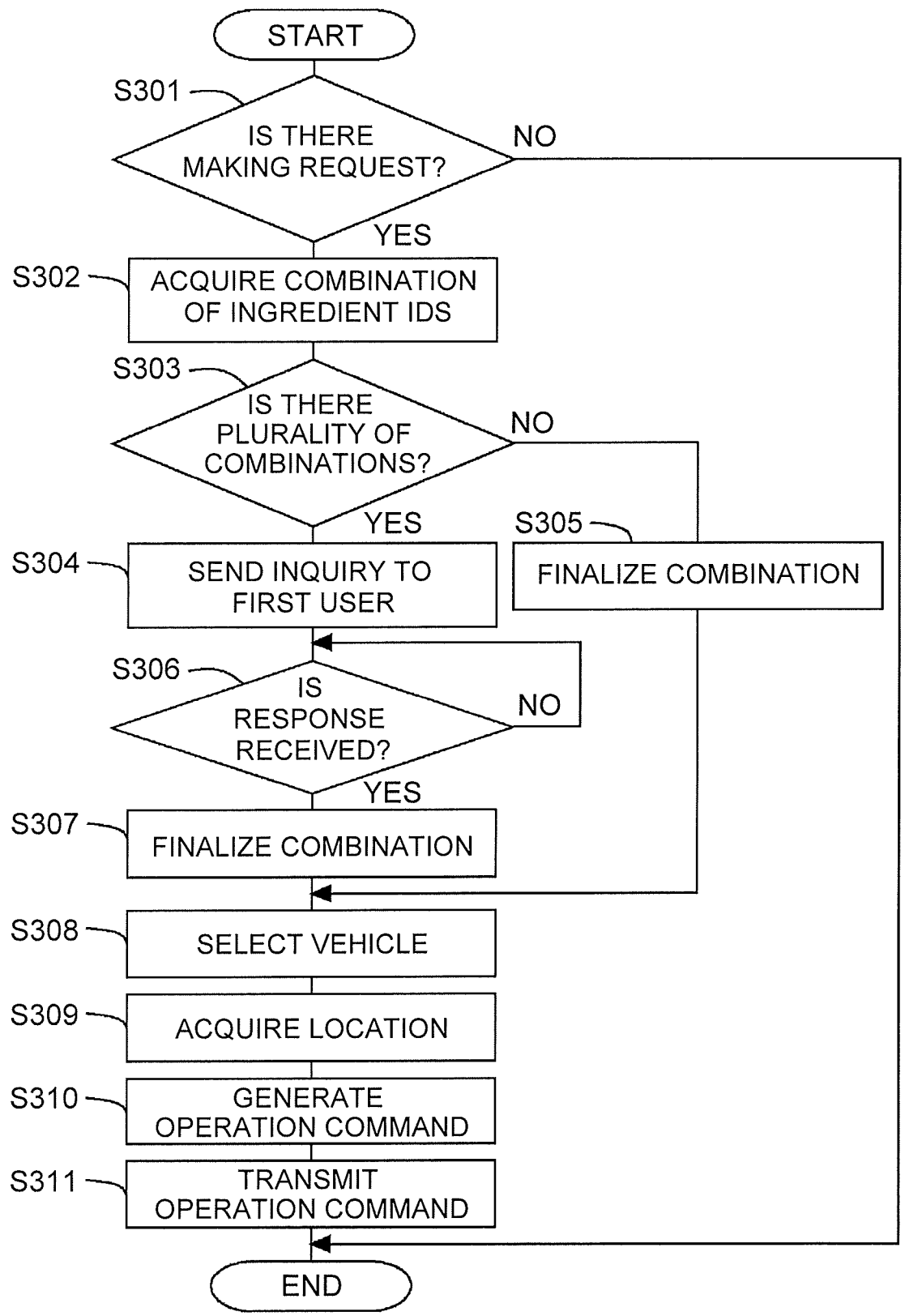
FIG. 20 is an example of the flowchart of a process of transmitting an operation command according to a second embodiment.

Description is now given of the process that the server 30 transmits an operation command to the vehicle 10. FIG. 20 is an example of the flowchart of the process of transmitting an operation command according to the embodiment. The process shown in FIG. 20 is executed by the processor 31 of the server 30 every prescribed time. Here, it is assumed that the server 30 has already received from the vehicle 10, the first terminal 20A, and the second terminal 20B the information necessary to construct the ingredient information DB 312, the vehicle information DB 313, dish information DB 314, and the movement information DB 315.

In step S301, the making request acquisition unit 303 determines whether or not a making request is received from the first terminal 20A. When positive determination is made in step S301, the process proceeds to step S302. When negative determination is made, the present routine is ended.

In step S302, the ingredient selection unit 305 acquires all the combinations of ingredient IDs corresponding to ingredients and cookware necessary to make a dish in the making request. The ingredient selection unit 305 accesses the dish information DB 314 and the ingredient information DB 312, and selects, out of the combinations of ingredient IDs corresponding to the dish ID in the making request, all the combinations of the ingredient IDs all having the selectability being "selectable". When there is no combination of the ingredient IDs all having the selectability being "selectable", the ingredient selection unit 305 may notify to the first user that the first user is unable to make a dish due to the shortage of an ingredient or cookware.

In step S303, the ingredient selection unit 305 determines whether or not there are a plurality of combinations acquired in step S302. When positive determination is made in step S303, the process proceeds to step S304. When negative determination is made, the process proceeds to step S305. In step S305, since there is only one combination of ingredient IDs, the ingredient selection unit 305 finalizes that the dish is made with this combination of the ingredient IDs.

In step S304, the ingredient selection unit 305 transmits to the first terminal 20A a request (selection request) to select one combination out of the combinations of ingredient IDs. In short, the ingredient selection unit 305 sends an inquiry to the first user about the combination to select. The selection request is generated by the ingredient selection unit 305 and transmitted to the first terminal 20A. The selection request includes information used for displaying on the first terminal 20A a screen for prompting selection of ingredients or cookware.

In step S306, the ingredient selection unit 305 determines whether or not there is a response to the selection request from the first terminal 20A. When positive determination is made in step S306, the process proceeds to step S307. When negative determination is made, the process of step S306 is executed again.

In step S307, the ingredient selection unit 305 finalizes that the product is made from the combination of ingredient IDs responded from the first terminal 20A. In step S308, the vehicle selection unit 302 selects the vehicle 10 for making the dish. The vehicle selection unit 302 accesses the vehicle information DB 313, and selects the vehicle 10 that supports the combination of ingredient IDs finalized in step S305 or step S307 and that has a working state set to "standby."

Since the process of step S309 to step S311 is the same as the process of step S104 to step S106, description thereof is omitted. The flowchart shown in FIG. 16 is applicable as a flowchart of the process for controlling the vehicle 10 to travel according to the present embodiment.

As described in the foregoing, the present embodiment enables the first user to procure, by using the vehicle 10 that autonomously travels, ingredients and cookware for a dish, and to make the dish. Furthermore, since the first user can select ingredients and cookware, the need of the first user can be met. Since the first user can select ingredients and cookware, the enjoyment of the first user can be increased.

Other Embodiments

The aforementioned embodiments are merely illustrative. The present disclosure can suitably be modified and implemented without departing from the scope of the present disclosure.

In the embodiments disclosed, the case of making a dish in the vehicle 10 has been described. However, without being limited to this case, the present disclosure is also applicable to the case of producing a product, for example. The production of a product may include reconstruction, repair, decoration, and the like, of a product possessed by the first user. For example, in the case of producing a product, a moving route is generated such that the vehicle 10 travels via locations of ingredients, components, and tools necessary for producing the product.

The processes or means described in the present disclosure can freely be combined and implemented without departing from the range of technical consistency.

Moreover, the process described to be performed by one device may be executed by a plurality of devices in cooperation with each other. Alternatively, the processes described to be executed by different devices may be executed by one device. In the computer system, the hardware configuration (server configuration) that implements each function may flexibly be changed. In the above embodiments, the server 30 includes, as the functional components, the vehicle management unit 301, the vehicle selection unit 302, the making request acquisition unit 303, the ingredient information acquisition unit 304, the ingredient selection unit 305, the movement information acquisition unit 306, the operation command generation unit 307, the user information DB 311, the ingredient information DB 312, the vehicle information DB 313, the dish information DB 314, the movement information DB 315, the map information DB 316, and the image information DB 317. However, some or all of these functional components may be included in the vehicle 10.

The present disclosure can also be implemented when a computer program, mounted with the functions described in the embodiments, is supplied to a computer, and one or more processors included in the computer read and execute the program. Such a computer program may be provided to the computer by a non-transitory computer readable storage medium that is connectable with a system bus of the computer, or may be provided to the computer through a network. Examples of the non-transitory computer readable storage medium include disks of any type, including magnetic disks (such as floppy (registered trademark) disks and hard disk drives (HDD)), and media of any type suitable for storing electronic commands, including optical disks (such as CD-ROM, DVD disks, Blu-ray Disc), read only memories (ROM), random-access memories (RAM), EPROM, EEPROM, magnetic cards, flash memories, and optical cards.

What is claimed is:

1. An information processing apparatus configured to control a mobile object that travels autonomously, the apparatus comprising:
a processor configured to:
acquire information regarding a request of a user making a product while riding on the mobile object;
acquire information regarding plurality of articles used in making the product including an order for making the product using the plurality of articles;
acquire information regarding a location of each of the articles;
generate an operation command that instructs the mobile object to carry the user via each of the locations of the articles in the order of making the product using the plurality of articles; and
cause transmission of the operation command to the mobile object,
wherein the mobile object includes an environment information sensor configured to detect an environment around the mobile object a motor; a brake; a steering mechanism; and a processor configured to generate an operation plan for moving the mobile object along a moving route including each of the locations in the order based upon the operation command, generate a control command based upon the operation plan and the environment around the mobile object, and drive at least one of the motor, the brake, and the steering mechanism based on the control command such that mobile object travels autonomously along the moving route.

2. The information processing apparatus according to claim 1, further comprising a memory configured to store the information regarding the article corresponding to the product.

3. The information processing apparatus according to claim 1, wherein the information regarding the plurality of articles includes at least information regarding an ingredient of the product.

4. The information processing apparatus according to claim 1, wherein the information regarding the plurality of articles includes at least information regarding a tool used in making the product.

5. The information processing apparatus according to claim 1, wherein when there is a plurality of combinations of the articles corresponding to the product, the processor is configured to output a request for selecting one combination out of the combinations.

6. The information processing apparatus according to claim 5, when a plurality of ingredients, each having a different place of production or a different producer, are present in the combinations, the processor is configured to send an inquiry to the user for selecting one ingredient out of the ingredients.

7. The information processing apparatus according to claim 5, when a plurality of cookware, each different in manufacturer, is present in the combinations, the processor is configured to send an inquiry to the user for selecting one cookware from the plurality of cookware.

8. The information processing apparatus according to claim 1, wherein the processor is configured to control a display to output a method of making the product.

9. A method of information processing for controlling a mobile object that travels autonomously, the method comprising:
    acquiring information regarding a request of a user making a product while riding on the mobile object;
    acquiring information regarding a plurality of articles used in making the product including an order for making the product using the plurality of articles;
    acquiring information regarding a location of each of the articles;
    generating an operation command that instructs the mobile object to carry the user via each of the locations of the articles in the order of making the product using the plurality of articles; and
    causing transmission of the operation command to the mobile object,
    wherein the mobile object includes an environment information sensor configured to detect an environment around the mobile object; a motor; a brake; a steering mechanism; and a processor configured to generate an operation plan for moving the mobile object along a moving route including each of the locations in the order based upon the operation command, generate a control command based upon the operation plan and the environment around the mobile object, and drive at least one of the motor, the brake, and the steering mechanism based on the control command such that mobile object travels autonomously along the moving route.

10. A non-transitory computer readable medium storing a program for causing a computer to control a mobile object that travels autonomously, the control including a method comprising:
    acquiring information regarding a request of a user making a product while riding on the mobile object;
    acquiring information regarding a plurality of articles used in making the product including an order for making the product using the plurality of articles;
    acquiring information regarding a location of each of the articles;
    generating an operation command that instructs the mobile object to carry the user via each of the locations of the articles in the order of making the product using the plurality of articles; and
    causing transmission of the operation command to the mobile object,
    wherein the mobile object includes an environment information sensor configured to detect an environment around the mobile object a motor; a brake; a steering mechanism; and a processor configured to generate an operation plan for moving the mobile object along a moving route including each of the locations in the order based upon the operation command, generate a control command based upon the operation plan and the environment around the mobile object, and drive at least one of the motor, the brake, and the steering mechanism based on the control command such that mobile object travels autonomously along the moving route.

* * * * *